I. ROSE.
COMBINED KNIFE AND BOTTLE OPENER.
APPLICATION FILED JUNE 30, 1909.

964,558.

Patented July 19, 1910.

WITNESSES:
E. A. Pell
M. G. Johnson

INVENTOR
Isaac Rose,
BY
Wm. H. Canfield.
ATTORNEY

THE NORRIS PETERS CO., WASHINGTON, D. C.

UNITED STATES PATENT OFFICE.

ISAAC ROSE, OF NEWARK, NEW JERSEY.

COMBINED KNIFE AND BOTTLE-OPENER.

964,558.

Specification of Letters Patent. Patented July 19, 1910.

Application filed June 30, 1909. Serial No. 505,131.

*To all whom it may concern:*

Be it known that I, ISAAC ROSE, a citizen of the United States, residing at Newark, in the county of Essex and State of New Jersey, have invented certain new and useful Improvements in Combined Knives and Bottle-Openers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a combined pocket-knife and bottle-opener, and is designed to provide a knife having a blade or blades which can be used in the manner of an ordinary pocket-knife, being adapted to be normally placed between the cheek-pieces of the handle and to be swung therefrom when the blades are to be used for cutting.

The bottle-opener is placed intermediate of the ends of the handle and so arranged that the hook of the bottle-opener is not accidentally caught in the pocket of the wearer, but is at all times ready for use whether the blade is open or shut.

The invention is illustrated in the accompanying drawing, in which—

Figure 1:
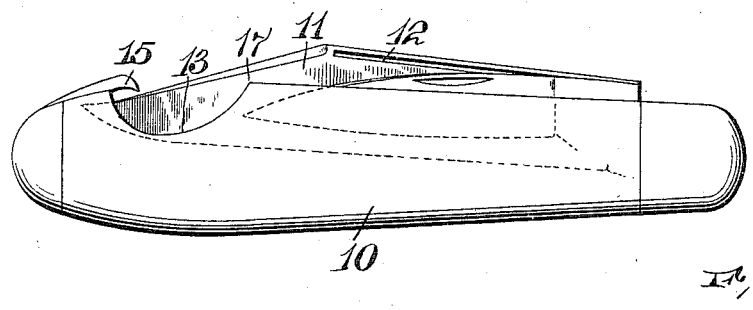
Figure 2:
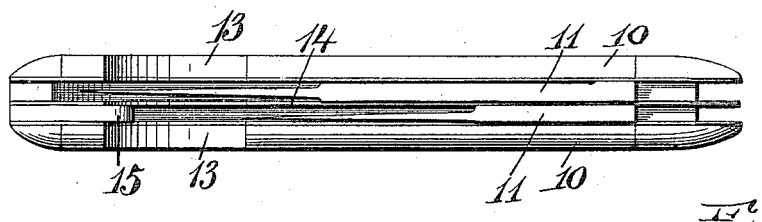
Figure 3:
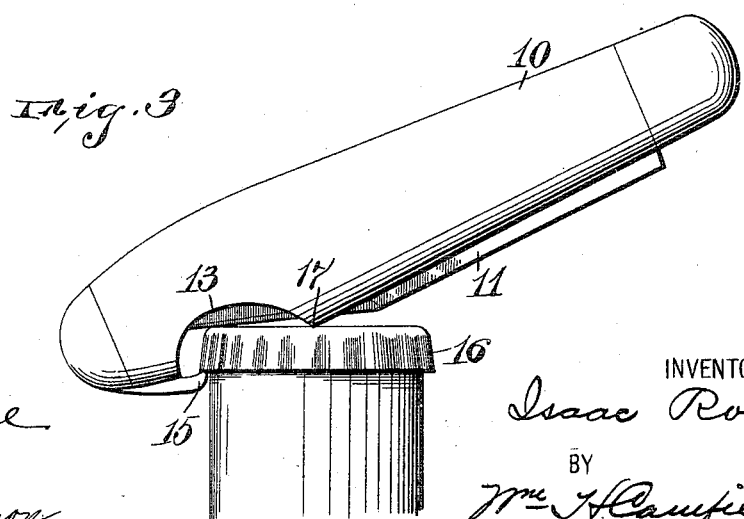

Figure 1 is a side view of a knife having the bottle-opener arranged therein. Fig. 2 is a top view thereof, and Fig. 3 is a view similar to Fig. 1, but showing the bottle-opener in operation.

The knife comprises cheek-pieces 10 which form a handle, and in one end of the handle are arranged the blades 11, one blade 11 being adapted to project to nearly the end of the knife and project partly from the handle so as to give access to the groove 12, ordinarily placed in clasp-knives, so that the finger-nail can be inserted to open the blade. The blade is normally held in the position shown in Fig. 1, and it requires some pressure to swing the blade out from the handle, but the blade has a movement within the handle which is permitted by the spring that holds the blade in its different positions. The blade however has a portion near its end cut away so that it is normally in the position to almost close a recessed portion 13 which extends all the way across the knife, that is, through the cheek-pieces, and if more than one blade is in the knife, across the central strip 14. This recess forms a portion of the bottle-opener and is arranged intermediate of the ends of the knife, being preferably within the handle portion, but nearer one end than the other, and preferably near the free end or swinging end of the blade.

Secured to the handle is a curved hook 15 which projects partly over one edge of and slightly within the recess and forms a hook for engaging the bottom edge of a sealing cap 16 of any usual form, this hook being arranged on the outer end of the recess 13, the inner edge 17 of the recess being adapted to act as a fulcrum and rest on the top of the cap or seal 16. When the bottle-opener is used with the blade shut, advantage is taken of the inward movement of the blade 11, as shown in Fig. 3, so that enough clearance is obtained to permit the insertion of the hook 15 under the edge of the seal 16.

Having thus described my invention, what I claim is:—

1. A combined knife and bottle-opener comprising a handle, a blade pivoted at one end near one end of the handle and adapted to swing within the handle, the handle having a recess adapted to be partly closed by the blade when the blade is shut, and a curved hook on the handle and projecting from one edge of the recess and projecting partly within the recess, the other edge of the recess being adapted to be used as a fulcrum when the hook is used as a bottle-opener, the blade having a movement inward beyond its normal position where it closes the recess, whereby the bottle-opener can be used without opening the knife.

2. A combined knife and bottle-opener comprising a handle formed of two cheek-pieces, a blade pivoted near one end of the handle and adapted to rest between the cheek-pieces, the cheek-pieces being provided with alined recesses near the end in which the swinging end of the blade rests, the blade partly closing the recess when the blade is shut, and a curved hook on the handle at the end of the recess toward the end of the blade, the hook projecting partly within the recess, the blade having a movement inward beyond its normal position in the handle whereby the recess and hook can be used as a bottle-opener without opening the blade.

In testimony, that I claim the foregoing, I have hereunto set my hand this 28th day of June, 1909.

ISAAC ROSE.

Witnesses:
Wm. H. Camfield,
E. A. Pell.